*D. B. Neal,*
*Revolving Rake*

No. 93,829.  Patented. Aug. 17, 1869.

Witnesses—
F. W. Howard
L. C. Bradley

Daniel B. Neal
By his Attorney
Chas. F. Stansbury

United States Patent Office.

DANIEL B. NEAL, OF MOUNT GILEAD, OHIO, ※

Letters Patent No. 93,829, dated August 17, 1869.

IMPROVEMENT IN HORSE HAY-RAKES.

The Schedule referred to in these Letters Patent and making part of the same.

*To all whom it may concern:*

Be it known that I, DANIEL B. NEAL, of Mount Gilead, in the county of Morrow, and State of Ohio, have invented a new and improved Horse Hay-Rake; and I do hereby declare the following to be a full and correct description of the same, reference being had to the accompanying drawings, in which—

Figure 1:
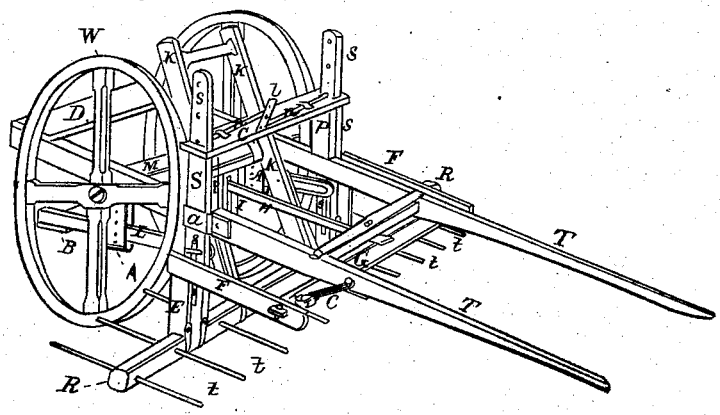
Figure 1 is a perspective view of my improved rake complete.
Figure 2:
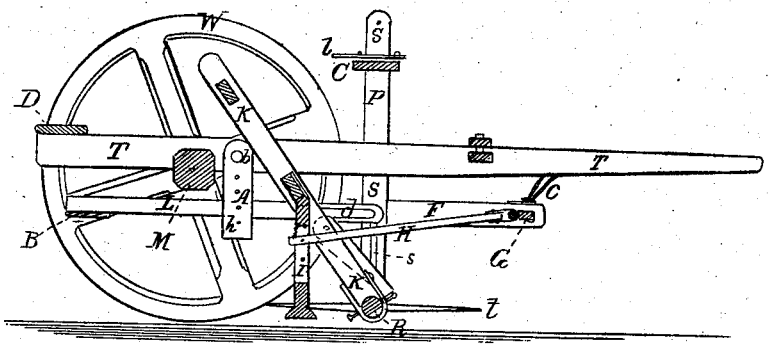
Figure 2 is a longitudinal vertical section of the same.

The same letter indicates the same part in both figures.

The nature of the invention consists in the peculiar mode of attaching and operating the rake, and supporting it out of contact with the ground when not in operation, all as hereinafter more fully set forth.

To enable others to make and use my improved rake, I will proceed to describe its construction and operation, referring to the accompanying drawings, by the letters and figures marked thereon.

The frame of the machine consists of the thills T T and the members which unite them.

They are united by a cross-piece below the swingle-tree, by the axle-tree M of the wheels W, and by the driver's seat D, which is attached to their rear ends.

To the frame thus formed, the operative parts are attached.

The rake-head R and tines $t$ are of the construction common in horse hay-rakes.

The head R is attached by straps, in which it turns freely, to two short posts E, to which are mortised horizontal levers F, united by the cross-bar C.

This bar is united by cords, $c$, to the thills T, as shown, this mode of attachment allowing great freedom of motion to the rake-head.

Strapped loosely at their lower ends to the rake-head R are two flat sides S, which pass up under straps $a$, attached to the thills, and through slots in the ends of a cap-piece, C, mortised on to the upper ends of two short posts, P, rising from the upper side of the thills T, as shown.

These slides have slots, $s$, in their lower ends and holes in their upper ends.

Two levers, L, are hung, in stirrups, A, to the thills by the pins $b$, which can be passed through any of the holes, $h$, in the stirrups, according to the height at which it is desired to suspend the levers.

The rear ends of these levers are united by a foot-board, B, loosely attached to them, on which the feet of the driver rest.

To the inside of the forward ends of these levers are attached the metallic straps $d$, the front ends of which are turned outward, passing through the levers and through the slots $s$ in the upright slides S.

It results from this construction that by pressing with his foot upon either end of the foot-board B, the driver can raise the corresponding end of the rake at will.

The shifting-lever K, with its pawls, stop I, and rod H, is of the ordinary construction, and operates to turn the rake in the usual way.

On top of the cap-piece C is a latching-lever, $l$, attached to two sliding-bolts, $m$ $n$, which are driven into or withdrawn from the holes in the upper ends of slides S by the operation of the lever, which is under control of the driver. By it he is enabled to regulate the height of the rake-head above the ground, and to fix it at any desired height.

The operator sits on the seat D, his feet resting on the board B, and, the levers K and $l$ being within reach, he easily controls the operations of the rake, accommodating it to varying surfaces and revolving it at will.

Having thus fully described my invention,

What I claim therein as new, and desire to secure by Letters Patent, is—

1. The slides S S, looped to the rake-head R, as described, and serving to raise and lower it in the manner specified.

2. The combination and arrangement of the foot-board B, levers L, hung in stirrups A, with the slotted slides S, in the manner and for the purpose set forth.

3. The combination of the thills T, posts P, and mortised cap C, with the slides S, in the manner and for the purpose described.

4. The latching-lever $l$, with its bolts $m$ $n$, in combination with caps C and slides S, all constructed, arranged, and operating as specified.

The above specification of my said invention, signed and witnessed at Mount Gilead, Ohio, this 10th day of May, A. D. 1869.

DANIEL B. NEAL.

Witnesses:
A. M. BREESE,
S. A. PARSONS.

※ Ass'r to self, E. C. Chase, & W. W. McCracken of same place.